Patented Oct. 30, 1945

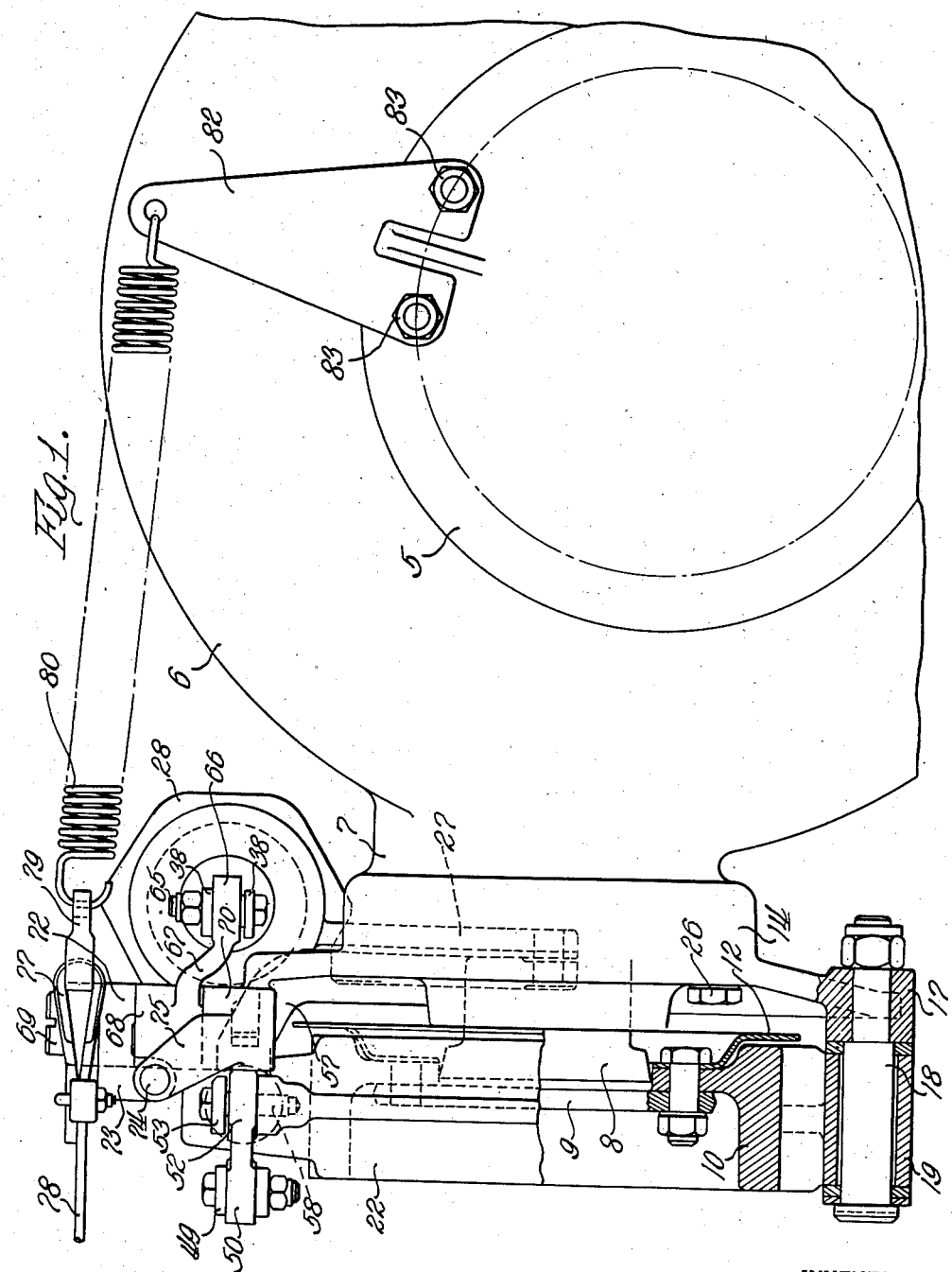

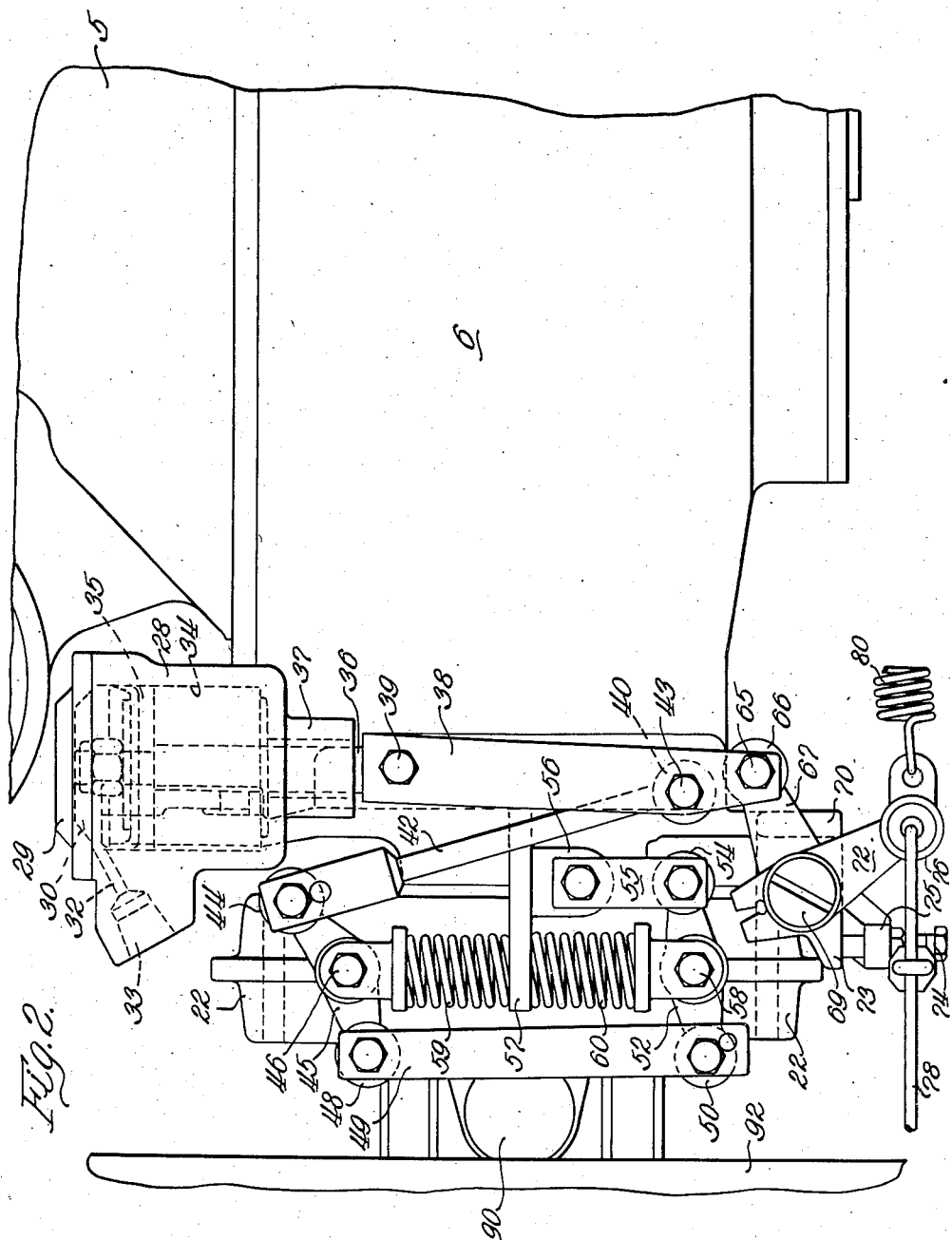

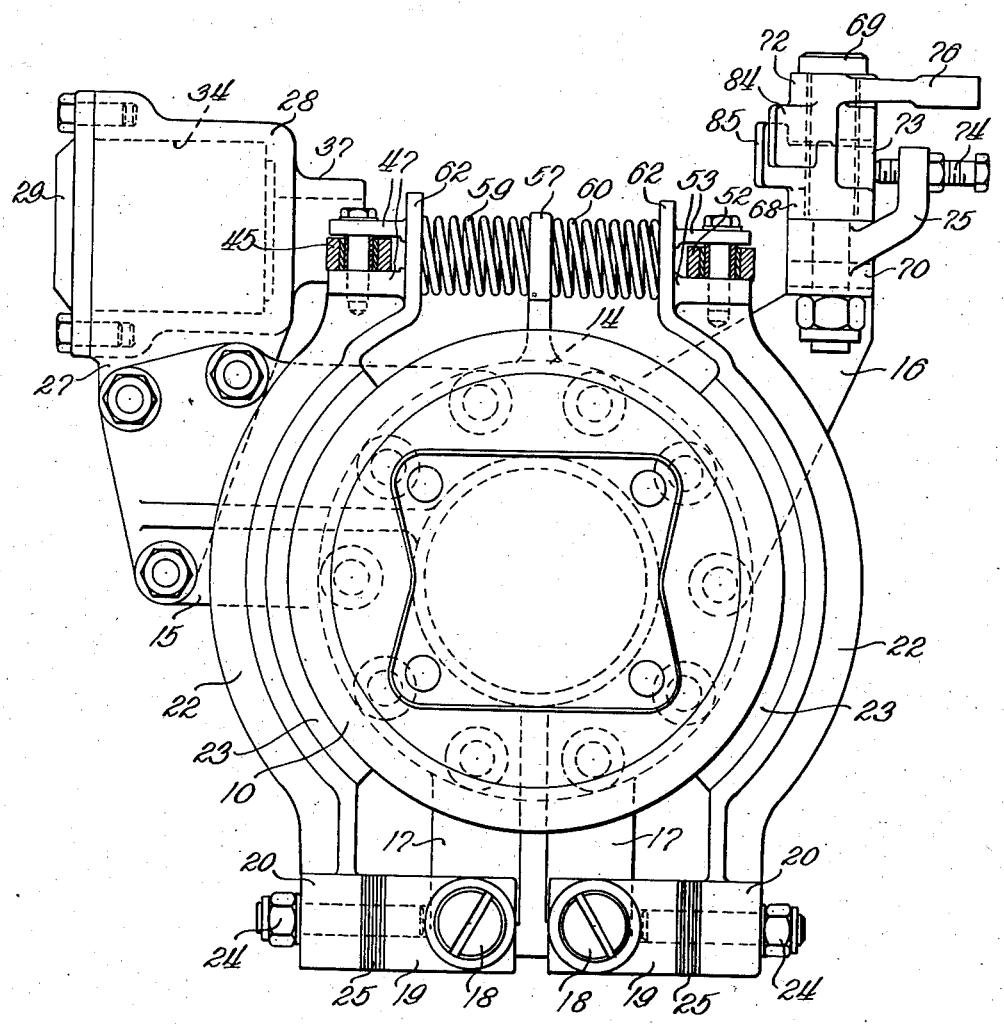

2,388,104

UNITED STATES PATENT OFFICE 2,388,104

BRAKE

Alfred O. Williams, Battle Creek, Mich., assignor to Clark Equipment Company, Buchanan, Mich., a corporation of Michigan Application March 11, 1944, Serial No. 526,057

5 Claims. (Cl. 188—106)

This invention relates to brakes, and more particularly is directed to a propeller shaft brake employed for applying braking effort between a source of driving torque and a driving axle.

In the form of the invention herein disclosed and described, the brake mechanism is shown as applied to a propeller shaft brake extending between the propeller shaft leading from an electric motor to a drive axle of a rail vehicle such as a streetcar, subway car or similar transit unit.

In my copending application Serial No. 504,214 filed September 29, 1943, Patent No. 2,365,369, Dec. 19, 1944, I have disclosed a streetcar truck having a propeller shaft brake embodied therein, which brake is in the form of a disc carried by the pinion shaft leading into the axle housing.

The present invention contemplates a brake of the external shoe type, the drum being mounted on the pinion shaft and the braking effort being applied through a pair of pivotally mounted shoes which are normally spread apart by springs toward brake released position.

One of the objects of the present invention is to provide a brake construction of this type which is readily adaptable to vehicles now in operation, and can be mounted thereon without any major change in design or construction.

Another object of the invention is to provide a simple type of actuating means for the brake, operated either by fluid pressure or air with provision for hand operation of the brakes in the event of power failure or for parking.

Other objects and advantages of the present invention will be more apparent from the following detail description which, taken in conjunction with the accompanying drawings, will disclose to those skilled in the art the particular construction and operation of a preferred form of the present invention.

In the drawings:

Figure 1 is a side elevational view, partly in section, of a brake construction according to the present invention;

Figure 2 is a top plan view of the construction shown in Figure 1; and

Figure 3 is an end elevational view of the construction shown in Figure 1.

Referring now in more detail to the drawings, in Figure 1 there is disclosed an axle housing 5 having the enlarged gear enclosing portion 6 which encircles and encloses the ring gear mounted on the axle shaft and driven by a pinion shaft extending through the nose 7 of the gear housing 6. This pinion shaft is provided with a flanged sleeve or coupling 8 terminating in a radial flange portion 9 to which is bolted the annular brake drum member 10, this member being cylindrical in form and, as shown, being arranged for conjoint rotation with the propeller shaft to which the pinion shaft is connected. A suitable shield plate or disc 12 is also mounted in position to shield the braking surface and brake shoes from any possible oil leakage out through the nose of the housing 7.

Bolted to the nose of the housing 7, as indicated in more detail in Figure 3, is a flanged member 14 having a laterally extending ear portion 15, an angularly extending ear portion 16, and downwardly extending parallel boss portions 17 adapted to receive pivot pins 18 which are bolted thereto.

The pivot pins 18 are securely mounted in the boss portions 17 of the flange 14 and are adapted to receive pivotally mounted arms 19 to which are secured the ends 20 of brake shoe members 22. The brake shoe members 22 are provided on their inner arcuate surfaces with brake linings 23 adapted to have braking engagement with the surface of the brake drum 10.

It will be noted that the arms 19 are arranged for pivotal movement about the pins 18, as shown in detail in Figure 1, and the ends 20 of the brake shoes 22 are secured to the arms 19 by means of the studs 24, suitable shims 25 being interposed therebetween for purposes of adjustment. Thus, the brake shoes 22 are supported for pivotal movement about the pins 18 carried by the boss portion 17 of the flange member 14.

The member 14, as shown, is secured to the end of the nose portion of the housing 7 by means of a series of circumferentially spaced bolts which are indicated in Figure 1 at 26 and which may be readily removable for disassembling the entire brake construction from the housing 6 or for assembling the same thereto without requiring any major change in the housing construction.

The laterally extending ear 15 of the flange member 14 is adapted to receive a downwardly extending flange 27 forming a portion of the housing 28 which provides the cylinder for the air or fluid operated piston. The cylinder 28 is provided with an end cap 29, bolted or otherwise secured thereto, closing the end of the cylinder, and within this end cap there is disposed a recess 30 communicating through the passageway 32 with the port 33 by means of which fluid may be introduced under pressure into the outer end of the cylinder 34. Disposed within the cylinder 34 is a piston 35 of any desired construction having the axially extending piston rod 36 projecting outwardly through the reduced guide portion 37 of the body member 28 and connected externally of the housing 28 to a pair of arm members 38 which are bolted thereto as by means of bolt 39.

The arm members 38 extend substantially longitudinally of the piston rod 36, and adjacent their outer ends are bolted to opposite sides of the end 40 of a pull arm 42 which is pivotally secured to the arms 38 by means of the bolt 43. The arm 42 at its opposite end is connected to one end 44 of a bell crank member 45 which member is pivotally mounted intermediate its ends by the pin 46 between oppositely extending lug portions 47 formed at the upper end of one of the brake shoes 22. The opposite end of the bell crank 45 indicated at 48 is adapted to receive link members 49 extending between the end 48 of the bell crank 45 and the end 50 of a second bell crank 52 mounted between the lug portions 53 of the opposite brake shoes 22. The opposite end of the bell crank 52, indicated at 54, is anchored by means of the link 55 to a support 56 carried by the normally extending flange portion 57.

It will be apparent that, by anchoring the end 54 of the bell crank 52, any pull upon the rod 42 results in conjoint inward movement of the pivot pins 46 and 58 upon which the bell cranks 45 and 52 are mounted due to the connecting arms 49 between these two bell cranks. As a result, the brakes are forced inwardly against the pressure of springs 59 and 60 biased between the flange 57 and the substantially radially extending ends 62 of the brake shoes 22.

Thus, when fluid under pressure is admitted to the cylinder 34 the piston 35 moves outwardly tending to move the arms 38 therewith. This results in a pull on the rod 42, tending to rotate the bell crank 45 in a clockwise direction. This, in turn, through the arms 49 imparts a similar clockwise rotation to the bell crank 52. However, this bell crank being anchored at its opposite end results in a movement of the fulcrum 58 inwardly toward the flange 57 and at the same time the fulcrum 46 of the bell crank 45 also moves inwardly, thereby applying the brake shoes firmly against the external annular surface of the brake drum 19.

Upon release of the fluid pressure, the springs 59 and 60 immediately act to spread the brake shoes and return the piston 35 to the position shown in Figure 2 thereby releasing the braking action.

In addition to the semi-automatic operation of the brakes through the fluid actuating piston, however, it is also desirable to provide means for actuating the brakes when the power is off as, for example, when the vehicle is being parked for storage or repair or under similar situations, or emergency conditions. To accomplish this result I have provided at the ends of the arms 38 a second pivot pin 65 which pivotally secures the end 66 of a crank arm 67 between these arms. The crank arm 67 is provided at its opposite end with an enlarged boss portion 68 mounted upon a stud 69 secured in the laterally extending flange portion 70 of the angularly extending ears 16 of the member 14. Mounted on the pin 69 above the end 68 of the crank 67 is a second crank member 72 shown in more detail in Figure 2, and provided with an offset depending ear portion 73 as shown in Figures 1 and 2. The ear portion 73 is adapted to be engaged by an adjustable screw member 74 carried by an extension 75 of the flange 70 limiting rotation of the crank arm 72 in a counter-clockwise direction. The free end of the arm 72 indicated at 76 is adapted to receive the loop end 77 of a cable member 78 which cable member is connected in any suitable manner to a hand brake operating mechanism preferably disposed adjacent the driver of the vehicle. An extension 79 on the end 76 of the lever or crank 72 is adapted to receive one end of a coil spring member 80, the opposite end of which is anchored in a flanged plate 82 bolted to the housing 5 as indicated at 83. The tension of the spring 80 holds the crank member 72 against counterclockwise rotation by abutment of the lug portion 73 with the adjustable screw 74. However, when the hand brake mechanism is operated the crank arm 72 is rotated in a clockwise direction against the tension of the spring 80 and upon predetermined rotation the ear 84 of the crank arm 72 moves into engagement with the ear 85 of the crank arm 67 as clearly shown in Figure 3 so that further clockwise rotation of crank 72 results in clockwise rotation of the arm 67. The rotation of this arm is in effect similar and produces the same movement as actuation of the piston 35, since it draws the arms 38 outwardly away from the housing 28, thereby exerting a pull on the rod 32 and, in turn, actuating the brakes in the same manner as if the piston 35 has been actuated. Upon release of the hand brake mechanism the slack introduced in the cable 78, in turn, is taken up by the spring 80 returning the parts to the position shown in Figure 2. It is thus apparent that the hand brake mechanism can be employed to actuate the brake mechanism in substantially the same manner as it is actuated by the power actuating mechanism, and that because of the lost motion connection between the crank arms 72 and 67 the hand brake mechanism does not interfere at all with normal operation of the braking device under the influence of air or fluid pressure.

It is therefore believed apparent that I have provided a novel type of brake mechanism which can be adapted to vehicles of the type now in use, since removal of the brake drum and the flange member 14 results in disassembly of the entire brake mechanism from the housing, it being understood, of course, that the spring 80 must be disengaged and the cable 78 released. However, it is not necessary to interfere with any portion of the axle construction or with any portion of the propeller shaft construction except the universal joint indicated at 90 to which the pinion flange 9 is connected. This universal joint is in turn connected to the propeller shaft leading from the motor of the vehicle and extends under the cross frame member 92, forming a part of the truck construction as shown in detail in my copending application referred to above.

I am aware that certain changes may be made in the details of the present construction without in any way departing from the principles of my invention, and I therefore do not intend to be limited except as defined by the scope and spirit of the appended claims.

I claim:

1. The combination, with a ring gear housing having a nose portion through which a drive shaft extends, of a brake drum mounted on said shaft, a supporting member detachably secured to said nose portion of said housing about said shaft, and braking means mounted on said member and including a pair of pivotally mounted brake shoes for engaging said drum, an actuating piston, and actuating means including interconnected levers carried by said shoes and piston for simultaneously engaging said shoes with said drum, a pivotally mounted bell crank connected to said actuating means, and a manually rotatable crank having abutment means for engaging said bell crank to operate said actuating means independently of said piston.

2. The combination, with a ring gear housing having a nose portion through which a drive shaft extends, of a brake drum mounted on said shaft, a member detachably secured to said nose portion adjacent said drum about said shaft, and braking means carried by and removable with said member, comprising a pair of brake shoes pivotally supported thereby, a cylinder mounted thereon having a piston therein, means including bell cranks pivoted on adjacent ends of said shoes and connected to said piston for engaging said shoes with said drum upon admission of fluid under pressure to said cylinder, and spring means biased between the free ends of said shoes and an intermediate portion of said member normally urging said shoes away from said drum.

3. In combination, a brake drum having an external annular braking surface, a piston arranged at right angles to said drum and having an extending actuating arm, a pivotally mounted crank supporting the free end of said arm, a pair of brake shoes pivotally supported at adjacent ends and partially encircling said drum, bell-crank levers pivotally mounted intermediate their ends on the adjacent free ends of said shoes and having their corresponding ends interconnected, one of said bell cranks having its opposite end anchored, spring means normally tending to spread the free ends of said shoes apart, and means interconnecting the opposite end of said other bell crank and an intermediate portion of said piston arm whereby actuation of said piston tends to force said shoes into engagement with said drum, and a manually operable crank mounted coaxially with said first-named crank and rotatable in one direction to actuate said first-named crank for engaging said shoes, said cranks having free movement in the opposite direction.

4. In combination, a rotatable brake drum, a pair of brake shoes partially encircling said drum, a supporting member providing pivotal support for the adjacent ends of said shoes, a cylinder supported by said member, a piston therein, means interconnecting said piston and the free ends of said shoes, a crank arm pivotally supported by said member and connected to said interconnecting means, a second crank arm pivotally mounted above said first arm and connected to a remotely disposed manual operating means, and interengaging ears between said crank arms for actuating said first arm upon actuation of said second crank arm to engage said brakes, said interengaging ears providing lost motion connection between said crank arms when said piston is actuated.

5. In combination, a rotatable brake drum, a pair of brake shoes partially encircling said drum, a supporting member providing pivotal support for the adjacent ends of said shoes, a cylinder supported by said member, a piston therein, means interconnecting said piston and the free ends of said shoes, means supported by said member for pivotal movement including a first element connected to said interconnecting means, a second element disposed coaxially thereabove and connected to a manual operating means, and interengaging ear means between said elements operative only upon actuation of said second element for rotating said first element to transmit brake applying movement to said interconnecting means.

ALFRED O. WILLIAMS.